United States Patent [19]
Prasad

[11] Patent Number: 6,049,542
[45] Date of Patent: Apr. 11, 2000

[54] SCALABLE MULTISTAGE INTERCONNECTION NETWORK ARCHITECTURE AND METHOD FOR PERFORMING IN-SERVICE UPGRADE THEREOF

[75] Inventor: Sharat C. Prasad, Plano, Tex.

[73] Assignee: Samsung Electronics Co., Ltd., Rep. of Korea

[21] Appl. No.: 09/002,042

[22] Filed: Dec. 31, 1997

[51] Int. Cl.[7] .......................... H04L 12/50; H04L 12/28; H04L 12/56; H04Q 11/00
[52] U.S. Cl. ............................. 370/386; 370/389
[58] Field of Search ..................... 370/370, 386, 370/371, 372, 375, 389, 392, 395, 396, 397, 400, 409; 340/359, 825.8

[56] References Cited

U.S. PATENT DOCUMENTS 4,989,022  1/1991  Hwang et al. ..................... 340/825.8
5,467,347  11/1995 Petersen .............................. 370/60.1
5,696,761  12/1997 Kos et al. ............................. 370/386

Primary Examiner—Douglas W. Olms
Assistant Examiner—David R Vincent
Attorney, Agent, or Firm—John C. Hans, Esq.

[57] ABSTRACT

There is disclosed a scalable switch fabric architecture comprising: 1) an input switching stage having N inputs and N outputs operable to connect selected ones of the N inputs to selected ones of the N outputs; 2) an output switching stage having M inputs and M outputs operable to connect selected ones of the M inputs to selected ones of the M outputs; 3) a multiplexer stage having a plurality of W-bit input channels and a W-bit output channel, wherein the output channel is coupled to the M inputs of the output switching stage; and 4) a removable core switching stage having N inputs adapted for coupling to the N outputs of the input switching stage and having M outputs adapted for coupling to a first input channel of the multiplexer stage.

21 Claims, 5 Drawing Sheets

SCALABLE MULTISTAGE INTERCONNECTION NETWORK ARCHITECTURE AND METHOD FOR PERFORMING IN-SERVICE UPGRADE THEREOF

TECHNICAL FIELD OF THE INVENTION

The present invention is directed, in general, to switching devices and, more specifically, to a scalable multistage interconnection network fabric and a method of perform an in-service upgrade thereof.

BACKGROUND OF THE INVENTION

Information systems have evolved from centralized mainframe computer systems supporting a large number of users to distributed computer systems based on local area network (LAN) architectures. As the cost-to-processing-power ratios for desktop PCs and network servers have dropped precipitously, LAN systems have proved to be highly cost effective. As a result, the number of LANs and LAN-based applications has exploded.

A consequential development relating to the increased popularity of LANs has been the interconnection of remote LANs, computers, and other equipment into wide area networks (WANs) in order to make more resources available to users. However, a LAN backbone can transmit data between users at high bandwidth rates for only relatively short distances. In order to interconnect devices across large distances, different communication protocols have been developed.

Another consequential development relating to the increased popularity of LANs has been an increase in the number of applications requiring very high-speed data transmission. Applications such as video conferencing require a large amount of bandwidth to transfer data and are relatively intolerant of switching delays. The need for higher speed communication protocols that are less susceptible to switching delays has led to the development of the asynchronous transfer mode (ATM) telecommunications standard. ATM provides speeds from 50 Mbps up to 10 Gbps) using fast packet switching technology for high performance.

ATM uses small fixed-size packets, called "cells". A cell is a 53-byte packet comprising 5 bytes of header/descriptor information and a 48-byte payload of voice, data or video traffic. The header information contains routing tags and/or multi-cast group numbers that are used to configure switches in the ATM network path to deliver the cells to the final destination.

Many packet switching architectures have been developed for implementation in ATM networks. One such architecture, known as multistage interconnection network (MIN), comprises a switching fabric that routs packets that come in from one of N input ports to the appropriate one, or appropriate subset, of N output ports. The multistage interconnection network comprises groups of switching element arranged in multiple stages. Each stage uses one or more bits in the packet (or cell) header to select the output to which the input packet is routed. This type of routing is known as "self-routing".

As the data traffic in a packet switch ATM network grows, it is frequently necessary to upgrade the switches therein from $N_1$ input/output ports to $N_2$ input/output ports, where $N_2 > N_1$. In the prior art systems, this involves a number of different options, each having distinct drawbacks. One "upgrade" method is to actually put in an over-sized fabric to begin with. Only that portion of the fabric that is needed to service the $N_1$ inputs and $N_1$ outputs is used. The excess switching fabric is not used until the system is upgraded to include $N_2$ inputs and $N_2$ outputs. This approach to upgrading results in unnecessary expense and an oversized switch for the job at hand.

Alternatively, a switch may be upgraded by shutting down the switch, removing the old fabric, and installing a new, larger fabric. The approach cannot be used in those implementations where service outages are unacceptable, such as the packet switch used by an Internet service provider.

A third approach involves the use of a redundant fabric architecture. The fabric is actually two redundant fabrics: a primary fabric and a standby fabric in parallel with one another. A redundant switch is upgraded by shutting down power in the standby fabric, removing the old standby fabric, and installing a new, larger standby fabric. Data traffic is then switched to the new standby fabric. The upgrade continues by shutting down power in the primary fabric, removing the old primary fabric, and installing a new, larger primary fabric. Data traffic may then be switched back to the new primary fabric or continue to be switched through the upgraded "former" standby fabric, which now assumes the role of the primary fabric. This approach is costly since both the primary and the standby switch fabrics are now waste.

There is therefore a need in the art for an improved packet switch architecture capable of being upgraded to a higher capacity without service disruption. There is a further need in the art for an improved packet switch architecture that initially requires only the minimum amount of switch fabric necessary to service the initial traffic requirements of the packet switch system. There is a still further need for an improved packet switch architecture that may be incrementally upgraded to handle higher data traffic capacities with a minimum amount of waste due to fabric replacement.

SUMMARY OF THE INVENTION

To address the above-discussed deficiencies of the prior art, it is a primary object of the present invention to provide a scalable switch fabric architecture comprising: 1) an input switching stage having N inputs and N outputs operable to connect selected ones of the N inputs to selected ones of the N outputs; 2) an output switching stage having M inputs and M outputs operable to connect selected ones of the M inputs to selected ones of the M outputs; 3) a multiplexer stage having a plurality of W-bit input channels and an W-bit output channel, wherein the output channel is coupled to the M inputs of the output switching stage; and 4) a removable core switching stage having N inputs adapted for coupling to the N outputs of the input switching stage and having M outputs adapted for coupling to a first input channel of the multiplexer stage.

In one embodiment of the present invention, N and M are equal, such that the input switching stage, the output switching stage, and the removable core switching stage are all N×N switches.

In another embodiment of the present invention, a second input channel of the multiplexer stage is adapted for coupling to M of R outputs of an output stage of a replacement core switching stage and the N outputs of the input switching stage are adapted for coupling to N of R inputs of an input stage of the replacement core switching stage, wherein the replacement core switching stage provides a parallel path around the removable core switching stage.

In a preferred embodiment of the present invention, R is greater than N.

In one embodiment of the present invention, the input switching stage receives ATM cell data comprising a cell header, wherein the cell header contains routing data operable to connect a selected one of the M inputs of the output switching stage to a selected one of the M outputs of the output switching stage.

In another embodiment of the present invention, the input switching stage receives ATM cell data comprising a cell header, wherein the cell header contains routing data operable to connect a selected one of the N inputs of the removable core switching stage to a selected one of the M outputs of the removable core switching stage.

In still another embodiment of the present invention, the input switching stage receives ATM cell data comprising a cell header, wherein the cell header contains routing data operable to connect a selected one of the N inputs of the input switching stage to a selected one of the N outputs of the input switching stage.

In yet another embodiment of the present invention, the input switching stage receives ATM cell data and randomly connects ones of the N inputs of the input switching stage to ones of the N outputs of the input switching stage to thereby distribute the ATM cell data across the ones of the N outputs.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged process facility.

Figure 1:
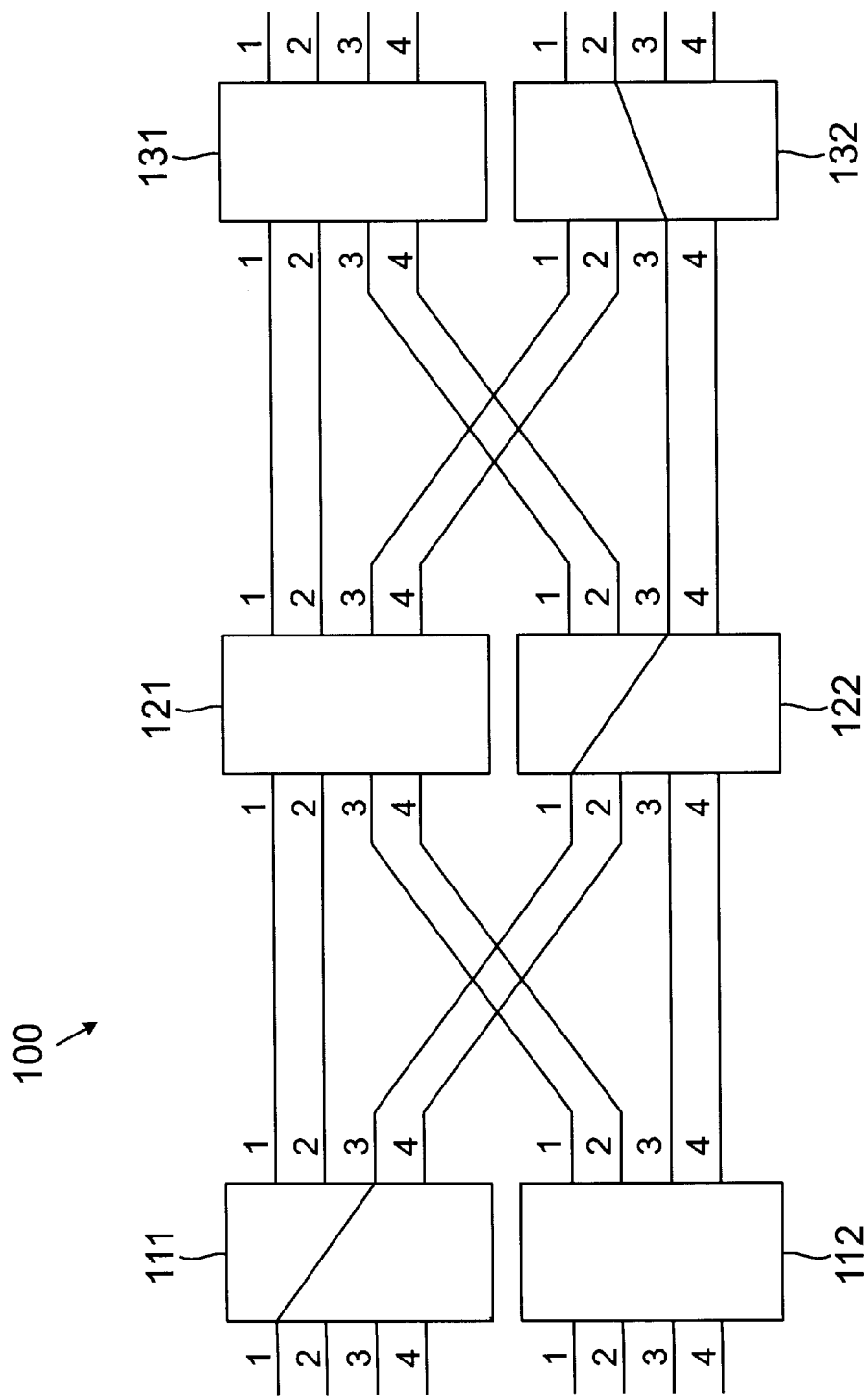
FIG. 1 illustrates a unicast virtual circuit established in an exemplary switch fabric architecture according to one embodiment of the prior art.

FIG. 1 illustrates a unicast virtual circuit established in an exemplary switch fabric architecture 100 according to one embodiment of the prior art. The switch fabric architecture 100 comprises three switching stages: a first switching stage comprising switch elements 111 and 112, a second switching stage comprising switch elements 121 and 122, and a third switching stage comprising switch elements 131 and 132. The first switching stage may also be referred to herein as the "input stage" and the third switching stage may also be referred to herein as the "output stage." The second stage may also be referred to herein as the "core stage."

The left side of each of switch elements 111, 112, 121, 122, 131, and 132 has four inputs, labeled 1 through 4 from top to bottom. The right side of each of switch elements 111, 112, 121, 122, 131, and 132 has four outputs, also labeled 1 through 4 from top to bottom. Any of the four inputs of each switch element may be internally connected to any of the four outputs of the same switch element. The input-to-output connection for each switch element is determined by the header information associated with each cell (or packet) received by the switch fabric architecture 100.

The switch fabric architecture 100 supports dynamic routing of unicast cells to realize high throughput. A dynamic routing network is composed of two sub-networks. The first switching stage comprises a "distribution" sub-network that randomizes the incoming unicast traffic by arbitrarily routing cells from its inputs to its outputs, thereby uniformly distributing the received cells across the first stage outputs. For example, switch element 111 has randomly connected input 1, which is receiving a data cell, to output 3.

The second switching stage and the third switching stage comprise a "routing" sub-network that routes the cells to their respective switch outputs. The routing sub-network routes cells based on a routing tag. For example, the routing tag for the cell transmitted from output 3 of the switch element 111 is [3:2] (decimal values). The switch element 122 uses the first value, [3], in the routing tag to connect the input on which the cell is received (input 1) to output 3. Similarly, the switch element 132 uses the second value, [2], in the routing tag to connect the input on which the cell is received (input 3) to output 2.

The connections through switching element 111, 122, and 132 comprise a unicast virtual circuit through the switch fabric architecture 100 that is operable to route cells from input 1 of the switch element 111 to output 2 of the switch element 132. Cells may arrive at the final fabric output out-of-order and are therefore re-sequenced at the output of the third stage before being forwarded.

Figure 2:
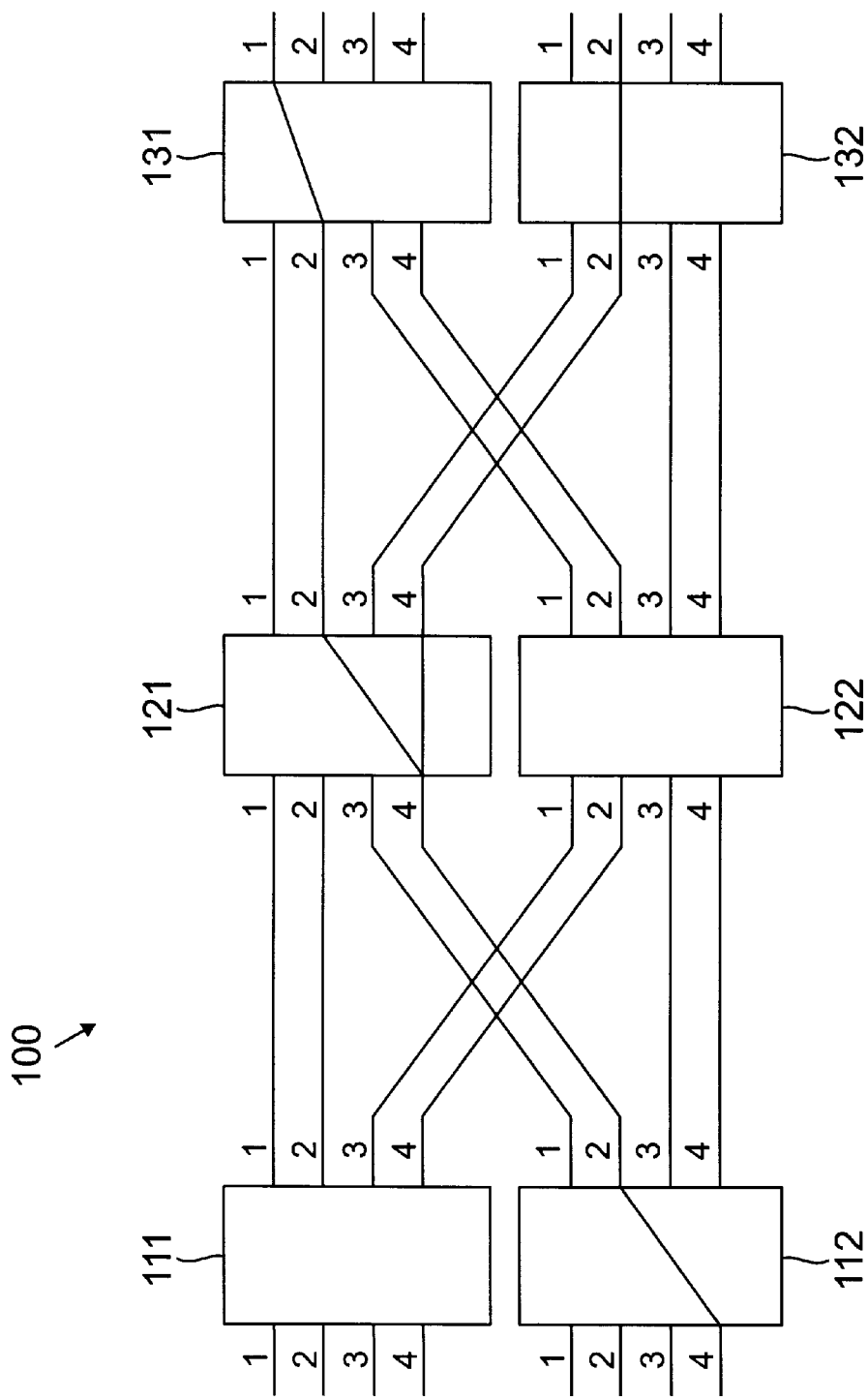
FIG. 2 illustrates a multicast virtual circuit established in the exemplary switch fabric architecture shown in FIG. 1 according to one embodiment of the prior art.

FIG. 2 illustrates a multicast virtual circuit established in the exemplary switch fabric architecture 100 shown in FIG. 1 according to one embodiment of the prior art. Unlike a unicast virtual circuit, multicast cells are forwarded by examining a Multicast Groups Table maintained in each switching element in each switching stage. The relevant entry in the Multicast Groups Table is indexed by a multicast group number carried in the extended header of each cell. The multicast group number is placed in the header of a cell before the cell arrives at the fabric.

For example, a cell received on input 4 of the switching element 112 may contain the multicast group number 6 in the cell header. The multicast group number 6 in the Multicast Groups Table in the switching element 112 contains the value [2], which causes the switching element 112 to connect the input on which the cell was received, input 4, to output 2. In the second switching stage, the multicast group number 6 in the Multicast Groups Table in the switching element 121 contains the values [2:4], which causes the switching element 121 to connect the input on which the cell was received, input 4, to output 2 and output 4.

In the third switching stage, the multicast group number 6 in the Multicast Groups Table in the switching element 131 contains the value [1], which causes the switching element 131 to connect the input on which the cell was received, input 2, to output 1. Additionally, the multicast group number 6 in the Multicast Groups Table in the switching element 132 contains the value [2], which causes the switching element 132 to connect the input on which the cell was received, input 2, to output 2. In sum, the connections through switching element 112, 121, 131, and 132 comprise a multicast virtual circuit through the switch fabric architecture 100 that is operable to route cells from input 4 of the switch element 112 to output 1 of the switch element 131 and to output 2 of the switch element 132.

The switch fabric architecture 100 described above is difficult to upgrade. If it is desired to expand the switch fabric architecture 100 from the eight input-eight output configuration shown to, for example, a thirty-two input-thirty-two output configuration, it is typically necessary to replace the entire fabric in order to support a higher capacity (bandwidth). Alternatively, the switch fabric architecture 100 may originally have been equipped with a fabric having the largest possible capacity, even though the interfaces in the original eight input/eight output configuration would only use a fraction of this capacity. If a standby fabric is used, the old fabrics of both the primary and the standby become waste. If no standby is used, then there will be a service interruption.

The present invention overcomes the problems inherent in the prior art by providing an improved switch fabric architecture that 1) allows the initial configuration of the switch to have only as much fabric as required to match the expected capacity, 2) can be incrementally upgraded to higher capacities at minimum cost, and 3) does not cause a service outage during an upgrading. An exemplary embodiment of the invention uses a Multistage Interconnection Network fabric to self-route 1) unicast cells or packet fragments using a vector or one dimensional linear array of routing tags, and 2) multicast cells using Multicast Groups Tables. The routing tags or the multicast group number is placed in the header of a cell before the cell arrives at the fabric.

A routing tag vector contains the same number of entries as there are switching stages in the fabric. Each switch element is configured with its position or the stage number within the multistage fabric. In the case of unicast cells, each switch element examines only that entry or routing tag which corresponds to its switching stage number and routes the cell to one of its outputs based on the value of the routing tag. In the case of multicast cells, the multicast group number selects an entry in the Multicast Groups Table for each switch element. The Multicast Groups Table generates a bit vector having the same number of bits as there are outputs in the switch element. For each "1" in the bit vector, a copy of the cell is transmitted from the corresponding output.

The smallest capacity configuration of the present invention comprises three stages. All configurations from the smallest to the largest comprise an odd number of switching stages. The number of switching stages corresponding to the largest fabric is assumed to be known in advance and fixed. The fabric stages are always numbered as 1, 2, . . . , $(N+1)/2, \ldots, N-1, N$, where N is the number of switching stages corresponding to the largest fabric. For example, if N=9, then, for a three switching stage fabric, the switching stages are numbered 1, 5 and 9. The switching stages of a five switching stage fabric are numbered 1, 2, 5, 8, 9.

To grow the fabric from one capacity range (total number of stages=M) to the next higher capacity range (total number of stages M+2), the middle switching stage (switching stage $(N+1)/2$) of the existing fabric is logically removed and a three switching stage sub-fabric is inserted in the middle.

The routing tag vector placed in the header of the cells is always of length N, regardless of the actual number of switching stages in the current fabric. The individual routing tags are always assigned those values which a full N-switching stage fabric would require to route the cell to its correct output.

The routing of multicast cells within the fabric involves the multicast group number in the cell header and the Multicast Groups Table within the switch elements. When the switch fabric is grown from M switching stages to M+2 switching stages, the Multicast Groups Table in the switch elements in the new first stage and the new third stage of the new sub-fabric are configured to initially carry out "pass through" routing (output number=input number). The Multicast Groups Tables from the switch elements in the new middle switching stage (i.e., the $(N+1)/2$ switching stage) of the new sub-fabric can be very simply deduced from knowledge of the Multicast Groups Tables for the original switching middle stage and the "pass-through" routing of the new first and new third switching stages.

Figure 3:
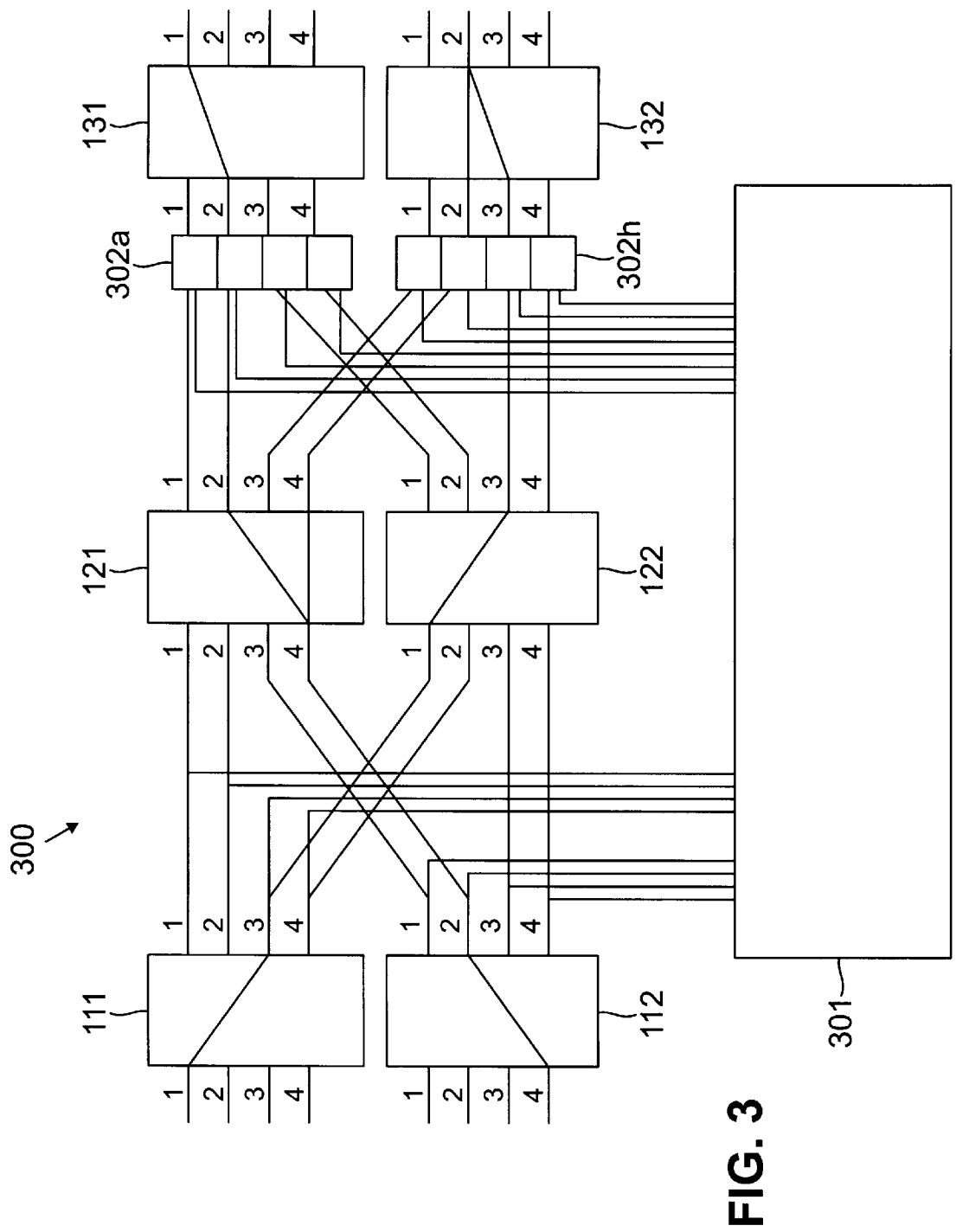
FIG. 3 illustrates an exemplary scalable switch fabric architecture according to one embodiment of the present invention.

FIG. 3 illustrates an exemplary scalable switch fabric architecture 300 according to one embodiment of the present invention. Much of the exemplary scalable switch fabric architecture 300 is similar to the switch fabric architecture shown in FIGS. 1 and 2. The scalable switch fabric architecture 300 comprises three switching stages: a first switching stage comprising N×M switch elements 111 and 112, a second switching stage comprising M×M switch elements 121 and 122, and a third M×N it switching stage comprising switch elements 131 and 132. The first switching stage may also be referred to herein as the "input stage" and the third switching stage may also be referred to herein as the "output stage." The second switching stage may also be referred to herein as the "core stage."

In one embodiment of the present invention, N and M are equal. However, those skilled in the art will recognize that the principles of the present invention may readily be implemented in switch fabrics in which some or all of the switching stages and/or some or all of the switch elements have a different number of input pins and output pins.

In parallel with the second switching stage is a replacement core stage 301, which will be explained in greater detail below in connection with FIGS. 4 and 5. The outputs of the first switching stage of the scalable switch fabric architecture 300 are coupled to the inputs of the second switching stage and are also coupled to the inputs of the replacement core stage 301. The outputs of the second switching stage of the scalable switch fabric architecture 300 are coupled to a first input channel of multiplexers 302a–302g. The outputs of the multiplexers 302a–302g are coupled to the inputs of the third switching stage. The outputs of the replacement core stage 301 are coupled to the second input channel of the multiplexers 302a–302g. The input and output channels of the multiplexers 302a–302g are W bits wide, where W may equal N, or M, or both.

It is noted that a unicast virtual circuit has been formed in the scalable switch fabric architecture 300 similar to the unicast virtual circuit shown in FIG. 1. Additionally, a multicast virtual circuit has been formed in the scalable switch fabric architecture 300 similar to the multicast virtual circuit shown in FIG. 2.

Prior to upgrading the scalable switch fabric architecture 300, the first channel of the multiplexers 302a–302g is always selected, so that the outputs of switch elements 121 and 121 are connected to the inputs of the switch elements 131 and 132. In this state, the replacement core stage 301 is inactive and the scalable switch fabric architecture 300 operates similarly to the prior art switch fabric architecture 100. However, when an upgrade is implemented, the second channel of the multiplexers 302a–302g is selected so that the outputs of the replacement core stage 301 are coupled to the inputs of the switch elements 131 and 132. In this state, all data cells flow through the replacement core stage 301 and the switch elements 121 and 122 are inactive.

Figure 4:
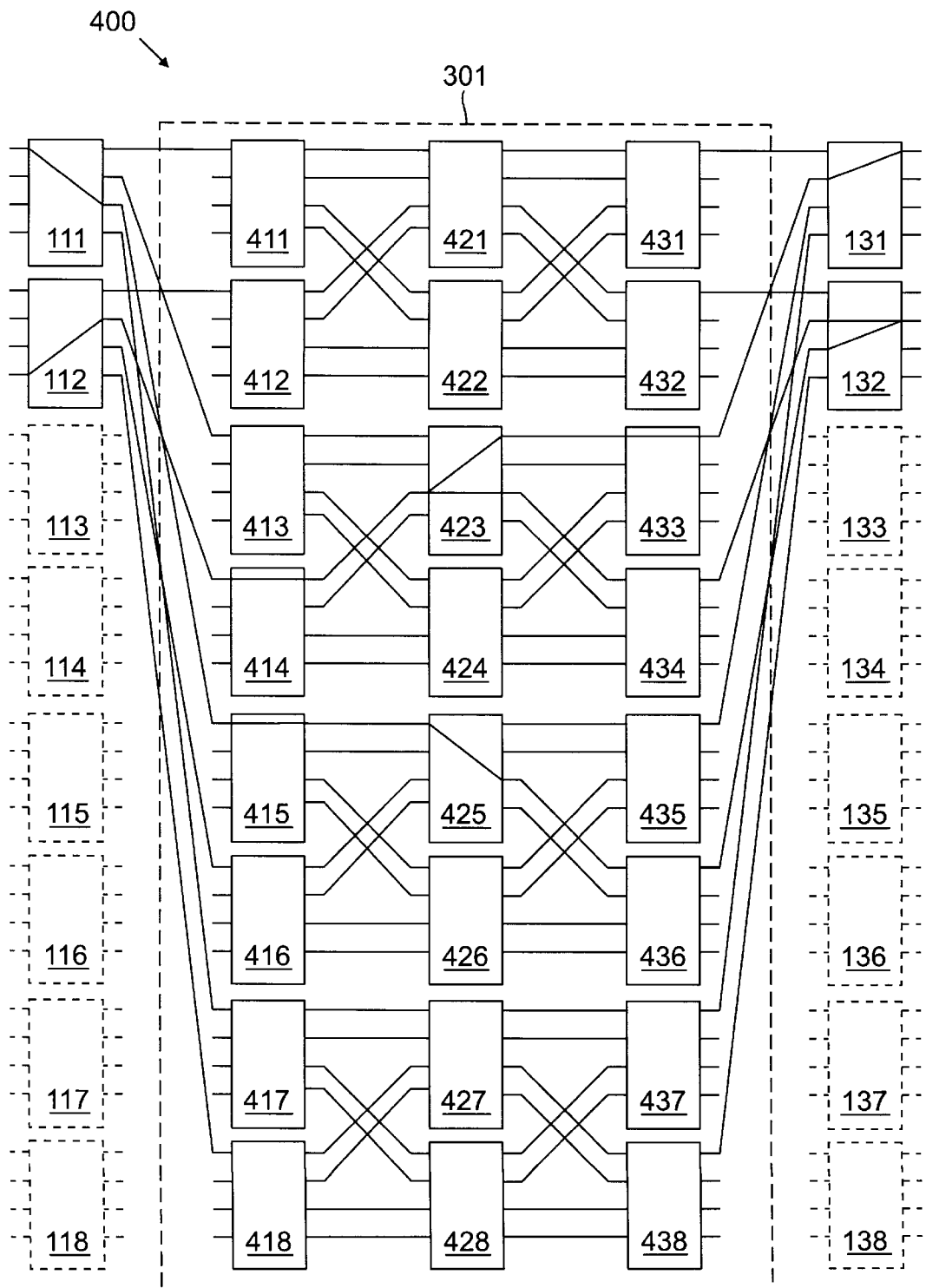
FIG. 4 illustrates in greater detail the exemplary scalable switch fabric architecture shown in FIG. 3 according to one embodiment of the present invention.

FIG. 4 illustrates in greater detail the exemplary scalable switch fabric architecture 300 shown in FIG. 3 according to one embodiment of the present invention. In order to perform an upgrade operation, the second channel of the multiplexers 302a–302g is selected so that the replacement core stage 301 is now in the switching path of data traffic. The original second (or core) switching stage is now inactive. For the purposes of simplicity and clarity in describing the replacement core stage 301, switch elements 121–122, which are to be removed, and the multiplexers 302a–302g, which are permanently set to the second channel, are not shown.

As part of the upgrade, the old core stage is removed and replaced by the replacement core stage 301. The outputs from the first switching stage and the inputs to the third switching stage are connected, respectively, to the inputs and outputs of the additional three stage sub-fabric. In order to indicate the expandable nature of the exemplary scalable switch fabric architecture 300, new (and unconnected) switches 113–118 are shown (in dotted line form) that may be added to the input stage at a later date. Additionally, new (and unconnected) switches 133–138 are shown (in dotted line form) that may be added to the output stage at a later date.

The replacement core stage 301 is a sub-fabric comprising three switching stages. The switch elements 111 and 112 still comprise the first switching stage, but the switch elements 131 and 132 are now re-designated as the fifth switching stage. The switch elements 111 and 112 in the first switching and the switch elements 131 and 132 in the third stage are retained with their Multicast Groups Table unchanged.

A new second switching stage comprises the switch elements 411–418, a new third switching stage comprises the switch elements 422–428, and a new fourth switching stage comprises the switch elements 431–438. The Multicast Groups Table of the switch elements 414 and 415 in the new second stage and the Multicast 5 Groups Table of the switch elements 433, 434 and 436 in the new fourth stage are initialized to carry-out "pass-through" routing. The pass-through routing is realized by creating for each multicast group which enters one of these switch elements through an input i an entry specifying just the output i.

By tracing the paths of the unicast virtual circuit and the multicast virtual circuit forward through the pass-through connections in the switch elements 411–418 in the new second switching stage, it can be determined that the unicast virtual circuit and the multicast virtual circuit enter switch element 423 on pin 3 and switch element 425 on pin 1 in the new third stage. By tracing the paths of the unicast virtual circuit and the multicast virtual circuit backward through the pass-through connections in the switch elements 431–438 in the new fourth switching stage, it can be determined that the unicast virtual circuit and the multicast virtual circuit exit switch element 423 on pins 1 and 3 and switch element 425 on pin 3 in the new third stage.

From this knowledge, it can be determined that the Multicast Groups Table for the switch element 423 in the new third stage is laterally shifted by −1 with respect to the Multicast Groups Table for the switch element 121 in the original core stage. Hence, the value [2,4] in the multicast group for switch element 121 is now the value [1,3] for switch element 423. It can also be determined that the Multicast Groups Table for the switch element 425 in the new third stage is laterally shifted by 0 with respect to the Multicast Groups Table for the switch element 122 in the original core stage. Hence, the value [3] in the multicast group for switch element 122 remains the value [3} for switch element 425.

The new replacement core stage 301 is internally symmetrical in that the inputs and outputs of the switch elements 421–428 in the new third switching stage are hardwired, respectively, to outputs on the switch elements 411–418 that are numerically equal to inputs on the switch elements 431–438. For example, input 3 and output 3 of the switch element 423 are hardwired to output 1 of the switch element 414 and input 1 of the switch element 434, respectively. The new replacement core stage 301 is also externally symmetrical in that corresponding input pins on the input switch elements 411–418 and output pins on the output switch elements 431–438 are hardwired, respectively, to outputs on the switch elements 111 and 112 that are numerically equal to inputs on the switch elements 131 and 132. For example, input 1 of switch element 413 and output 1 of switch element 433 are hardwired to output 2 of the switch element 111 and input 2 of the switch element 131, respectively.

The internal and external symmetric wiring of the three stages in the replacement core stage 301 and the pass-through routing of the new second switching stage and the new fourth switching stage make it possible to maintain the ongoing unicast virtual circuit and multicast virtual circuit. The traffic cells from the unicast virtual circuit and the multicast virtual circuit both are transferred to the same outputs on switch elements 131 and 132 to which they were transferred in FIGS. 1–3.

Figure 5:
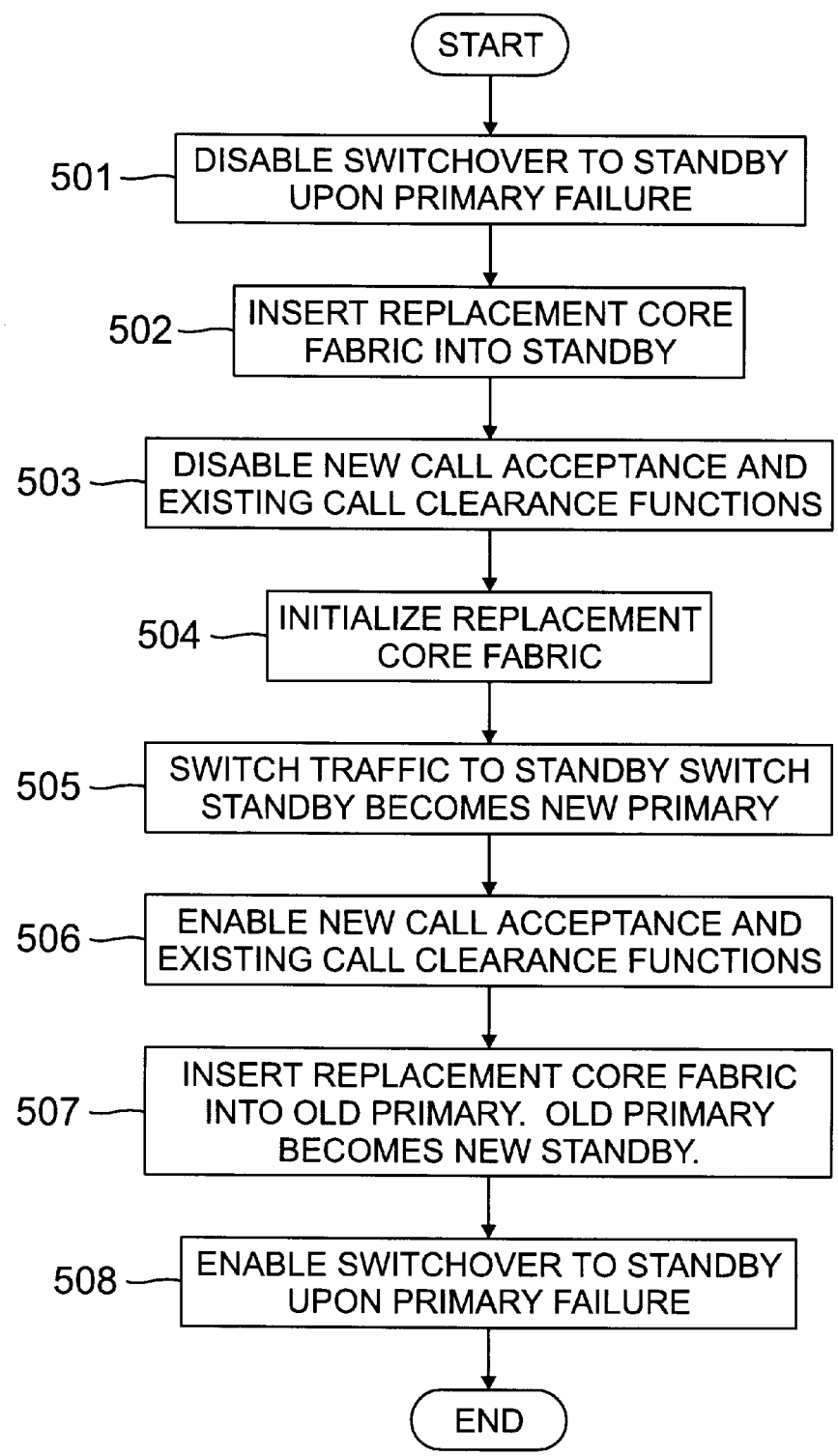
FIG. 5 is a flow diagram illustrating a process for upgrading the exemplary scalable switch fabric architecture shown in FIGS. 3 and 4 according to one embodiment of the present invention.

FIG. 5 is a flow diagram 500 illustrating a process for upgrading the exemplary scalable switch fabric architecture 300 shown in FIGS. 3 and 4 according to one embodiment of the present invention. It is assumed that the exemplary scalable switch fabric architecture 300 is either one of a primary or a standby switch fabric.

Initially, the automatic switch-over function for diverting data traffic to the standby fabric upon the occurrence of a default in the primary fabric is disabled (process step 501). Next, a replacement core stage 301 is inserted in parallel with the original (i.e., second) core stage in the original standby fabric (process step 502). The new call acceptance function and the existing call clearing function are disabled in the standby fabric (process step 503).

Next, the new three-switching-stage sub-fabric is initialized (process step 504). Once data cells have been transmitted from the original core stage of the primary fabric and there are no outstanding call setup or clear transactions, data traffic is switched over to the upgraded standby fabric (process step 505). This puts the original low-capacity primary fabric in the stand-by mode and makes the new upgraded standby fabric the primary fabric. New call acceptance and existing call clearance functions are enabled and data cells may now enter the standby fabric (process step 506).

Next, a second replacement core stage 301 is inserted in parallel with the original (i.e., second) core stage in the primary fabric (process step 507). The automatic switch-over function for diverting data traffic to the standby fabric upon default in the primary fabric is then re-enabled (process step 508).

Although the present invention has been described in detail, those skilled in the art should understand that they can make various changes, substitutions and alterations herein without departing from the spirit and scope of the invention in its broadest form.

What is claimed is:

1. A scalable switch fabric architecture comprising:
   an input switching stage having N inputs and N outputs operable to connect selected ones of said N inputs to selected ones of said N outputs;
   an output switching stage having M inputs and M outputs operable to connect selected ones of said M inputs to selected ones of said M outputs;
   a multiplexer stage having a plurality of W-bit input channels and a W-bit output channel, wherein said output channel is coupled to said M inputs of said output switching stage; and
   a removable core switching stage having N inputs adapted for coupling to said N outputs of said input switching stage and having M outputs adapted for coupling to a first input channel of said multiplexer stage.

2. The scalable switch fabric architecture set forth in claim 1 wherein N=M.

3. The scalable switch fabric architecture set forth in claim 1 wherein a second input channel of said multiplexer stage is adapted for coupling to M of R outputs of an output stage of a replacement core switching stage and said N outputs of said input switching stage are adapted for coupling to N of R inputs of an input stage of said replacement core switching stage, wherein the replacement core switching stage provides a parallel path around said removable core switching stage.

4. The scalable switch fabric architecture set forth in claim 3 wherein N=M.

5. The scalable switch fabric architecture set forth in claim 4 wherein R>N.

6. The scalable switch fabric architecture set forth in claim 1 wherein said input switching stage receives ATM cell data comprising a cell header, wherein said cell header contains routing data operable to connect a selected one of said M inputs of said output switching stage to a selected one of said M outputs of said output switching stage.

7. The scalable switch fabric architecture set forth in claim 1 wherein said input switching stage receives ATM cell data comprising a cell header, wherein said cell header contains routing data operable to connect a selected one of said N inputs of said removable core switching stage to a selected one of said M outputs of said removable core switching stage.

8. The scalable switch fabric architecture set forth in claim 1 wherein said input switching stage receives ATM cell data comprising a cell header, wherein said cell header contains routing data operable to connect a selected one of said N inputs of said input switching stage to a selected one of said N outputs of said input switching stage.

9. The scalable switch fabric architecture set forth in claim 1 wherein said input switching stage receives ATM cell data and randomly connects ones of said N inputs of said input switching stage to ones of said N outputs of said input switching stage to thereby distribute said ATM cell data across said ones of said N input switching stage outputs.

10. For use in a scalable switch fabric architecture comprising an input switching stage having N inputs and N outputs operable to connect selected ones of said N inputs to selected ones of said N outputs, an output switching stage having N inputs and N outputs operable to connect selected ones of said N output switching stage inputs to selected ones of said N output switching stage outputs, and a removable core switching stage having N inputs adapted for coupling to said N input switching stage outputs and having N outputs adapted for coupling to said N output switching stage inputs, a replacement core switching stage for replacing said removable core switching stage, said replacement core switching stage comprising:
   an input switching sub-stage having R inputs and R outputs operable to connect selected ones of said R inputs to selected ones of said R outputs, wherein N of said R inputs are adapted for coupling to said N input switching stage outputs;
   an output switching sub-stage having R inputs and R outputs operable to connect selected ones of said R output switching sub-stage inputs to selected ones of said R output switching sub-stage outputs, wherein N of said R output switching sub-stage outputs are adapted for coupling to said N output switching stage inputs; and
   a removable core switching sub-stage having R inputs adapted for coupling to said R input switching sub-stage outputs and having R outputs adapted for coupling to said R output switching sub-stage inputs.

11. The replacement core switching stage set forth in claim 10 wherein R>N.

12. The replacement core switching stage set forth in claim 10 wherein said input switching sub-stage receives ATM cell data comprising a cell header, wherein said cell header contains routing data operable to connect a selected one of said R inputs of said output switching sub-stage to a selected one of said R outputs of said output switching sub-stage.

13. The replacement core switching stage set forth in claim 10 wherein said input switching sub-stage receives ATM cell data comprising a cell header, wherein said cell header contains routing data operable to connect a selected one of said R inputs of said removable core switching sub-stage to a selected one of said R outputs of said removable core switching sub-stage.

14. The replacement core switching stage set forth in claim 10 wherein said input switching sub-stage receives ATM cell data comprising a cell header, wherein said cell header contains routing data operable to connect a selected one of said R inputs of said input switching sub-stage to a selected one of said R outputs of said input switching sub-stage.

15. The replacement core switching stage set forth in claim 10 wherein said input switching sub-stage receives ATM cell data and randomly connects ones of said R inputs of said input switching sub-stage to ones of said R outputs of said input switching sub-stage to thereby distribute said ATM cell data across said ones of said R input switching sub-stage outputs.

16. For use in a scalable switch fabric architecture comprising an input switching stage having N inputs and N outputs operable to connect selected ones of the N inputs to selected ones of the N outputs, an output switching stage having N inputs and N outputs operable to connect selected ones of the N output switching stage inputs to selected ones of the N output switching stage outputs, and a removable core switching stage having N inputs adapted for coupling to the N input switching stage outputs and having N outputs adapted for coupling to the N output switching stage inputs, a method of replacing the removable core switching stage comprising the steps of:

connecting a replacement core switching stage in parallel with the removable core switching stage, the replacement core switching stage comprising:

an input switching sub-stage having R inputs and R outputs operable to connect selected ones of the R inputs to selected ones of the R outputs, wherein N of the R inputs are adapted for coupling to the N input switching stage outputs;

an output switching sub-stage having R inputs and R outputs operable to connect selected ones of the R output switching sub-stage inputs to selected ones of the R output switching sub-stage outputs, wherein N of the R output switching sub-stage outputs are adapted for coupling to the N output switching stage inputs; and a removable core switching sub-stage having R inputs adapted for coupling to the R input switching sub-stage outputs and having R outputs adapted for coupling to the R output switching sub-stage inputs; and switching data traffic to the replacement core switching stage from the removable core switching stage; and removing the removable core switching stage.

17. The method set forth in claim 16 wherein R>N.

18. The method set forth in claim 16 wherein the input switching sub-stage receives ATM cell data comprising a cell header, wherein the cell header contains routing data operable to connect a selected one of the R inputs of the output switching sub-stage to a selected one of the R outputs of the output switching sub-stage.

19. The method set forth in claim 16 wherein the input switching sub-stage receives ATM cell data comprising a cell header, wherein the cell header contains routing data operable to connect a selected one of the R inputs of the removable core switching sub-stage to a selected one of the R outputs of the removable core switching sub-stage.

20. The method set forth in claim 16 wherein the input switching sub-stage receives ATM cell data comprising a cell header, wherein the cell header contains routing data operable to connect a selected one of the R inputs of the input switching sub-stage stage to a selected one of the R outputs of the input switching sub-stage.

21. The method set forth in claim 16 wherein the input switching sub-stage receives ATM cell data and randomly connects ones of the R inputs of the input switching sub-stage to ones of the R outputs of the input switching sub-stage to thereby distribute the ATM cell data across the ones of the R input switching sub-stage outputs.

\* \* \* \* \*

UNITED STATES PATENT AND TRADEMARK OFFICE
CERTIFICATE OF CORRECTION

PATENT NO. : 6,049,542
DATED : April 11, 2000
INVENTOR(S) : Sharat C. Prasad

It is certified that error appears in the above-identified patent and that said Letters Patent is hereby corrected as shown below:

Col. 6, line 65, delete "302g" and insert therefor — 302h — (both instances).

Col. 7, line 1, delete "302g" and insert therefor — 302h —.

Col. 7, line 2, delete "302g" and insert therefor — 302h —.

Col. 7, line 11, delete "302g" and insert therefor — 302h —.

Col. 7, line 13, delete "121" and insert therefor — 122 —.

Col. 7, Line 18, delete "302g" and insert therefor — 302h —.

Col. 7, line 27, delete "302g" and insert therefor — 302h —.

Col. 7, line 32, delete "302g" and insert therefor — 302h —.

Col. 7, line 59, between "Multicast" and "Groups", delete "5".

Signed and Sealed this

Sixth Day of March, 2001

*Attest:*

NICHOLAS P. GODICI

*Attesting Officer*   *Acting Director of the United States Patent and Trademark Office*